Figure 1:
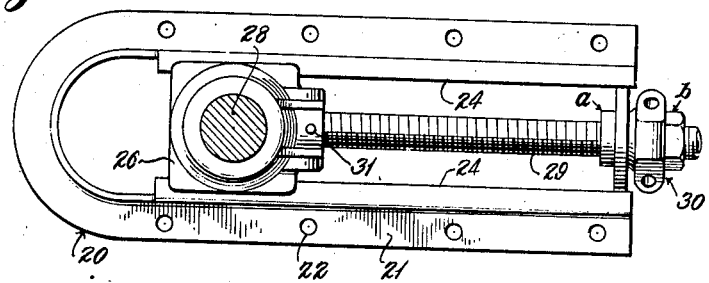

Feb. 28, 1939. G. H. GRIFFIN 2,148,691
TAKE-UP
Filed Oct. 21, 1937 3 Sheets-Sheet 1

Inventor
George H. Griffin
By L. Donald Myers
Attorney

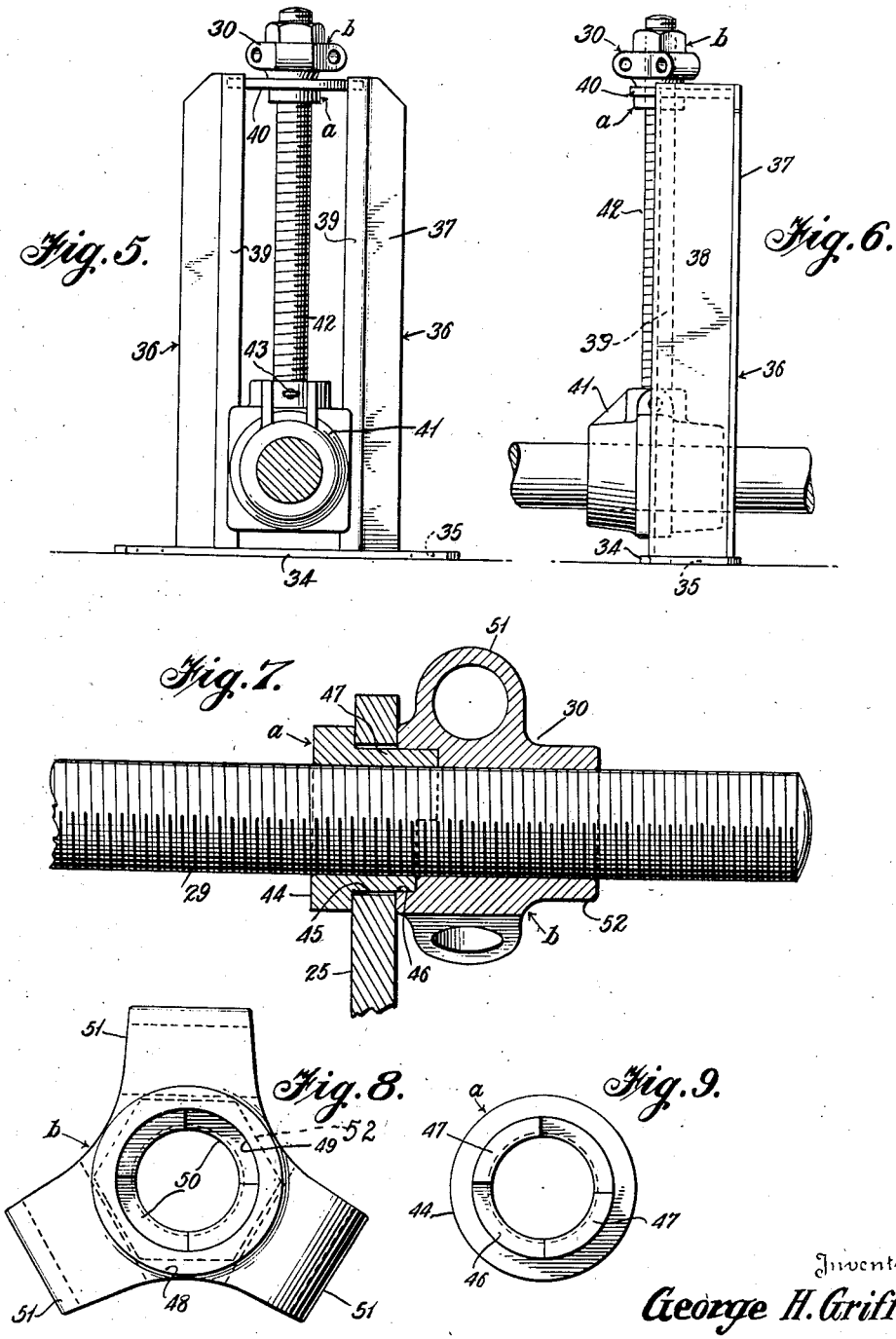

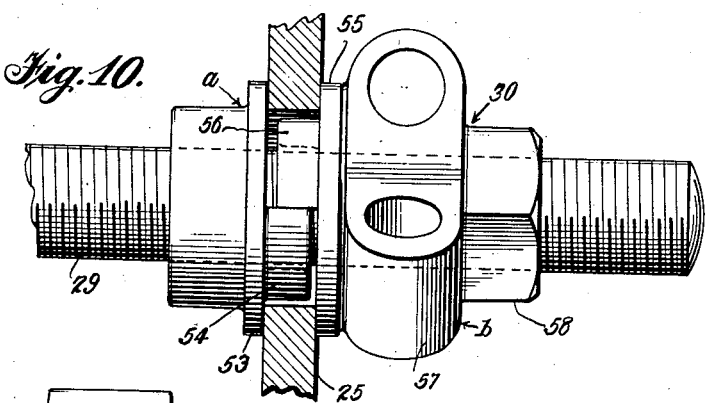
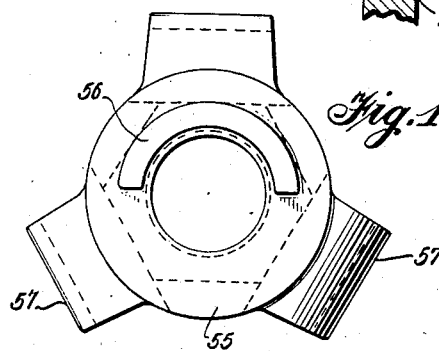
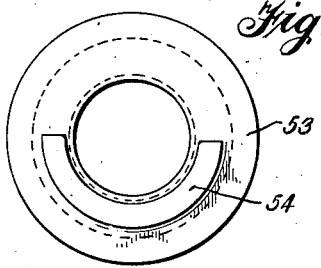
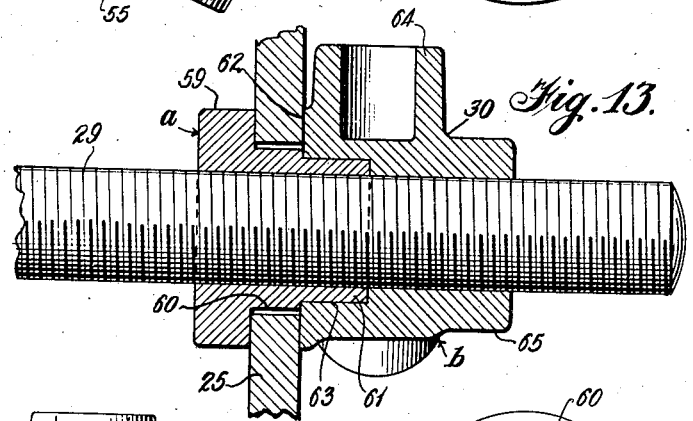
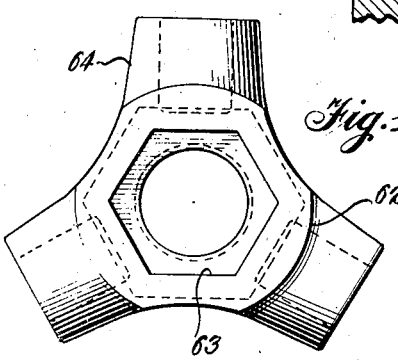
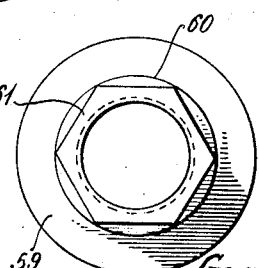

Patented Feb. 28, 1939

2,148,691

UNITED STATES PATENT OFFICE 2,148,691

TAKE-UP

George H. Griffin, San Francisco, Calif., assignor to Link-Belt Company, a corporation of Illinois Application October 21, 1937, Serial No. 170,297

15 Claims. (Cl. 308—59)

This invention relates to new and useful improvements in take-ups and deals particularly with the mechanism employed for effecting adjustment of the sliding bearings on the frame portions of the take-ups.

In take-ups of the type which involve effecting adjustment of the bearing by bodily moving the take-up screw with the bearing, it has been the practice to mount the adjusting nut, which is threaded on the screw, in a pocket or recess formed in one end portion of the take-up frame with the nut held by the walls of the pocket or recess so that it will not be permitted to partake of either axial or angular movement. Adjustment of the bearing is effected by applying a wrench, or the like, to the projecting end of the screw to effect rotation of the latter.

This type of take-up structure possesses several disadvantages, principal of which are:

1. The application of a wrench to the end of the screw, to effect turning of the screw, places undue strain on the screw which may damage the same. This undesirable strain, of course, increases as the end of the screw is moved farther away from the end of the frame in adjusting the bearing toward the nut.

2. Rotation of the screw necessitates the use of a separate joint between the screw and the bearing which will permit rotation of the screw relative to the bearing, which will take both compression and tension of the screw, and which will permit separation of the screw from the bearing.

3. The provision of a pocket in the end of the take-up frame complicates the construction of the frame; necessitates the use of considerable material to form the nut receiving pocket and renders awkward the work of inserting and withdrawing the nut with respect to the pocket.

4. In the rather recently developed pressed steel take-up frames, the formation of a nut receiving pocket necessitates fabricating several parts or elements or the shaping of a rather complicated one-piece pocket forming element. Either of these structures materially adds to the production cost and renders the nut end of the take-up frame the weakest part of the assembly.

It is the primary object of this invention to provide take-ups which possess maximum strength with minimum weight; which effect adjustment of the bearing without rotating the screw relative to the bearing and without requiring the application of a wrench to any portion of the screw, and which detachably connects the adjusting nut to the take-up frame without the provision of a nut receiving pocket on the same or any substitute complicated frame structure which will function in lieu thereof.

A further important object of the invention is to provide a novel type of take-up nut structure which is readily accessible exteriorly of the take-up frame for application of a suitable tool thereto to effect movement of the sliding bearing by rotation of the nut structure and which is detachably associated with simply an apertured wall of the take-up frame in a manner to apply the compression and tension forces to the frame.

Other objects and advantages of the invention will be apparent during the course of the following description.

Figure 2:
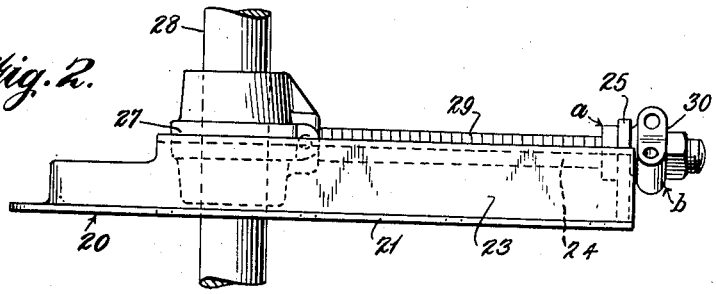
Figure 3:
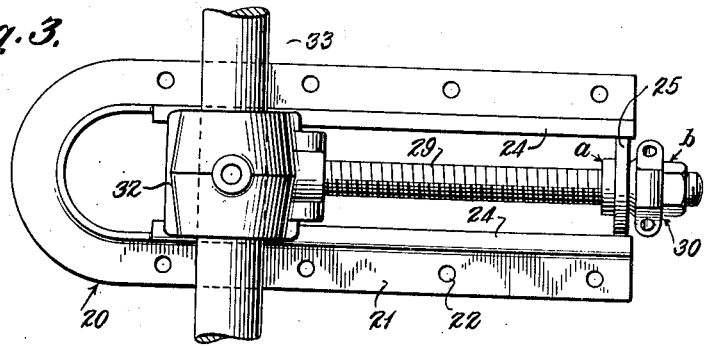
Figure 4:
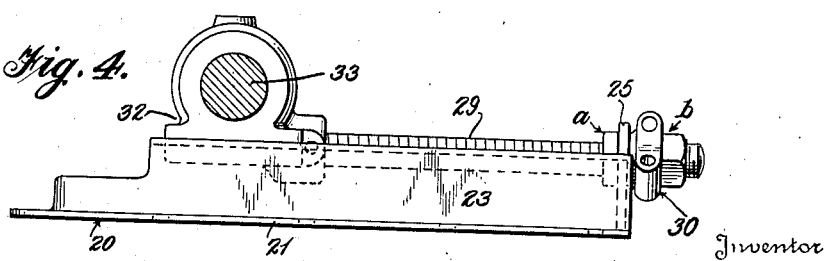

In the accompanying drawings forming a part of this specification and in which like numerals are employed to designate like parts throughout the same, Figure 1 is a plan view of one form of take-up embodying this invention, Figure 2 is a side elevational view of the take-up structure disclosed in Figure 1, Figure 3 is a plan view of a slightly modified form of take-up, Figure 4 is a side elevational view of the take-up structure disclosed in Figure 3, Figure 5 is a front elevational view of a still further modified form of take-up, Figure 6 is a side elevational view of the form of take-up disclosed in Figure 5, Figure 7 is a longitudinal sectional view of one form of take-up nut assembly which may be employed in any of the take-ups disclosed in Figures 1 to 6, inclusive, Figure 8 is an end elevational view of one part of the nut assembly disclosed in Figure 7, Figure 9 is an end elevational view of the second part of the nut assembly disclosed in Figure 7, Figure 10 is a side elevational view of a modified form of nut assembly which may be employed in any of the different types of take-ups disclosed in Figures 1 to 6, inclusive, Figure 11 is an end elevational view of one of the parts of the nut assembly disclosed in Figure 10, Figure 12 is an end elevational view of the second part of the nut assembly disclosed in Figure 10, Figure 13 is a longitudinal sectional view of a modified form of take-up nut assembly which, also, may be used with any of the different types of take-ups disclosed in Figures 1 to 6, inclusive, Figure 14 is an end elevational view of one part of the nut assembly disclosed in Figure 13, and Figure 15 is an end elevational view of the second part of the nut assembly disclosed in Figure 13.

In the drawings, wherein for the purpose of illustration are shown the preferred embodiments of this invention, Figs. 1 to 6, inclusive, illustrate the adaptability of the novel character of adjustment mechanism embodying this invention to different types and styles of take-ups, while Figs. 7 to 15 illustrate various modifications of the take-up adjustment mechanism embodying this invention. It is to be understood that Figs. 1 to 6, inclusive, are intended to represent the application of each one of the different forms of adjustment mechanisms to each one of the different styles of take-ups.

Referring particularly to Figs. 1 and 2, the reference character 20 designates the pressed steel frame of this form of take-up. This frame consists of a main body portion of substantially U-shape in plan which includes a base flange 21 having apertures 22 to receive screws, bolts, or the like by means of which the take-up is secured to a supporting structure. Angularly arranged with respect to the base flange 21 is an upstanding flange 23, the opposite side legs of which are provided with the inwardly directed guideways 24. The open end of the U-shaped frame is closed by an end wall or plate 25 having an aperture with its axis arranged substantially in the same plane as the guideways 24. The opposite end edges of the end wall or plate 25 are welded to the end portions of the opposite sides or branches of the U-shaped frame 20.

A bearing 26 is slidably mounted on the guideways 24 by means of the side grooves 27 which receive the said guideways. This bearing 26, it will be understood, is illustrative of either a plain babbitt bearing or any type of anti-friction ball or roller bearing. In the take-up disclosed in Figs. 1 and 2, the bearing 26 is of the type which will journal the shaft 28 with its axis extending at right angles to the plane of the base flange 21 of the take-up frame.

The bearing 26 is slidably adjusted with respect to the take-up frame by means of a take-up screw 29 and a take-up nut which is designated in its entirety by the reference character 30. The take-up screw 29 is received at one end in a socket formed in a side of the bearing 26. This end of the screw is secured in said socket against rotation relative to the bearing by means of a key or pin 31. The screw 29 extends outwardly through the aperture formed in the end wall or plate 25 during all operative positions of adjustment of the bearing 26.

The take-up nut assembly 30 includes the inner part a, which is threaded on the screw 29 and bears against the inner face of the end wall or plate 25 and an outer nut part b which also is threaded on the take-up screw 29 and bears against the outer face of the end wall or plate 25. The details of this two-part take-up nut assembly will be described in connection with Figs. 7 to 15, inclusive.

The take-up disclosed in Figs. 3 and 4 closely resembles the take-up disclosed in Figs. 1 and 2, as it includes the same frame structure with its apertured end wall, the same take-up screw and a two-part take-up nut. The reference characters applied to these various elements in Figs. 1 and 2, therefore, will be applied to the similar portions of the take-up disclosed in Figs. 3 and 4.

The bearing 32 differs from the bearing 26 of the formerly described take-up only by supporting the shaft 33 so that its axis will extend in a plane parallel to the plane of the base flange 21 for the U-shaped take-up frame 20. It is to be understood that the two-part take-up nut 30 is representative of each one of the take-up nut structures disclosed in Figs. 7 to 15, inclusive.

In the take-up disclosed in Figs. 5 and 6, there is illustrated a different type of take-up frame. This frame includes an end mounting plate 34 which has apertures 35 for receiving screws, bolts, or the like, by means of which the take-up may be secured to a supporting structure. Suitably welded to one face of the mounting plate 34 are the parallel side members 36. Each of these side members includes a rear flange 37 with an angularly arranged side flange 38. The free edge of the side flange is provided with an angularly arranged guideway 39. An end wall 40 is welded at its opposite ends to the inner faces of the side members 36 in the region of their outer ends.

Slidably mounted on the guideway 39 is a bearing 41 which may be of the plain babbitted type or of any conventional anti-friction roller or ball type.

The bearing 41 is adjusted longitudinally of the guideway 39 by means of the take-up screw 42 which has one end received in a socket formed in a suitable portion of the bearing 41. This end of the take-up screw is keyed or pinned to the bearing, as illustrated at 43, to prevent rotation of the screw relative to the bearing.

The end wall or plate 40 of the take-up frame is provided with an aperture in the same manner as described in connection with the take-up disclosed in Figs. 1 and 2. The take-up screw 42 always projects through the aperture of the end wall 40 and has threaded thereon the parts a and b of the two-part nut 30 which is journaled in the aperture of the end wall 40. It is to be understood that this two-part nut 30 is representative of each one of the take-up nut structures disclosed in Figs. 7 to 15, inclusive.

Referring now to Figs. 7 to 9, inclusive, there is illustrated one form of nut assembly 30 which includes the part a which is threaded on the take-up screw and bears against the inner face of the end wall or plate of a take-up frame. In Fig. 7, the take-up screw is designated by the reference character 29 and the end wall or plate is designated by the reference character 25. It is to be understood, however, that the screw and end wall of this figure might just as well bear the reference characters 42 and 40, respectively, which have been applied to the take-up disclosed in Figs. 5 and 6. The take-up nut 30 of Fig. 7 also includes the outer part b which is threaded on the take-up screw and bears against the outer face of the end wall 25.

The inner nut part is illustrated in detail in Figs. 7 and 9 as including an end collar 44 which is of sufficient diameter to bear against the inner face of the end wall 25. The nut part a is journaled in the aperture of the end wall 25 by means of the cylindrical portion 45. The cylindrical portion has formed thereon an extension 46 which is illustrated in Fig. 9 as being provided with the circumferentially spaced teeth or segments 47 which project axially of the extension 46. Fig. 9 clearly illustrates these teeth 47 as comprising quarter segments and as being diametrically opposed.

Figs. 7 and 8 illustrate the nut part b as including a collar portion 48 which is of suitable diameter to bear against the outer face of the end wall 25. A socket 49 is formed in the body of the nut part b and is shaped to receive the extension 46 of the nut part a. At the inner end of the socket 49, there are formed segmental teeth 50 which are suitably spaced and shaped to interlock with the teeth 47 of the nut part a when the two parts are telescopically associated as shown in Fig. 7.

The body of the nut part b further includes the aperture ears 51 which function as a capstan head for the nut assembly. By inserting a rod in any one of the apertures of the several ears, the entire nut may be rotated as a unit to effect adjustment of the take-up screw 29 relative to the end wall 25. The body of the nut part b also is provided with a hexagonal end portion 52 to which a wrench may be applied for effecting turning of the nut as a unit.

The nut 30 of Figs. 7 to 9, inclusive, may be assembled in take-up by arranging the nut parts a and b on opposite sides of a take-up frame end wall, as illustrated in Fig. 7. After arranging the nut parts in this manner, the take-up screw may be threaded through both parts of the nut. The interlocked teeth 47 and 50 of the two nut parts prevent these parts from partaking of relative angular movement so that rotation of one nut part will effect similar rotation of the other part. The threading of the screw 29 into both of the nut parts retains the latter against relative axial movement.

Referring now to Figs. 10 to 12, inclusive, there is illustrated a modified form of take-up nut 30 which includes the inner nut part a and the outer nut part b. Both of these parts are threaded on the take-up screw, which is given the reference character 29 although it is to be understood that this screw may be positioned in the take-up disclosed in Figs. 5 and 6. The two parts a and b of the nut engage opposite sides of the end wall 25.

The nut part a is provided with an enlarged collar 53 which is of proper diameter to cause the same to bear against the adjacent face of the end wall 25. Projecting from the inner face of the collar 53 is a semi-circular extension 54 which is clearly illustrated in Figs. 10 and 12. This extension is journaled in the aperture of the end wall 25 and is interposed between the wall of the aperture and the periphery of the take-up screw 29.

The outer nut part b is provided with a collar portion 55 which bears against the outer face of the end wall 25. Projecting from one face of the collar 55 is a semi-circular extension 56 which is clearly illustrated in Figs. 10 and 11. It will be appreciated that the semi-circular extensions 54 and 56, when the two nut parts are assembled as shown in Fig. 10, form a complete cylinder or circle which journals the nut assembly in the aperture of the end wall 25 and supports the take-up screw 29 in this aperture.

The body of the outer nut part b also includes the apertured ears 57 which collectively form a capstan head by means of which the nut may be rotated as a complete unit. A hexagonal extremity 58 also is formed on the body of the nut part b to permit a wrench, or the like, to be applied to the nut for rotating the same.

It will be understood that prior to positioning the take-up screw 29 within the aperture of the end wall 25, the two nut parts a and b may be brought together, as illustrated in Fig. 10, with their semicircular extensions 54 and 56 interlocked and with the collars 53 and 55 bearing against the opposite faces of the end wall 25. The take-up screw 29 may then be threaded through both of the nut parts and the nut is securely locked against separation from the end wall 25. Due to the interlocking engagement of the semi-cylindrical extensions 54 and 56, the two nut parts may not be rotated independently of each other and the take-up screw and the nut parts, therefore, are held against axial movement by the said take-up screw.

Referring particularly to the form of nut disclosed in Figs. 13 to 15, we find the inner and outer nut parts a and b threaded on the take-up screw 29 and arranged on opposite sides of the apertured end wall 25.

The inner nut part a includes an enlarged collar 59 which bears against the inner face of the end wall 25. Projecting axially from this collar is a cylindrical portion 60 which is journaled in the aperture of the end wall 25. Figs. 13 and 15 disclose an extension 61 of hexagonal formation carried by the cylindrical portion 60 and projecting axially therefrom.

The outer nut part b is illustrated in Figs. 13 and 14 as including a collar portion 62 which bears against the outer face of the end wall 25. The body of this nut part is provided with a socket 63 of hexagonal formation to receive the hexagonal extension 60 of the nut part a. A capstan head 64 is formed on this outer nut part b as well as a hexagonal wrench engaging portion 65. Either the capstan head 64 or the wrench engaging portion 65 may be employed for rotating this nut 30 as a unit.

This form of two-part nut may be assembled in the same manner as described in connection with the nut disclosed in Figs. 7 to 9, inclusive. The telescopic association of the hexagonal extension 61 and socket 63, of course, will interlock the two nut parts against relative angular movement so that when the take-up screw 29 is threaded through both nut parts, relative angular movement of these parts cannot take place.

Although Figs. 1 to 6, inclusive, illustrate take-ups as including pressed steel frames, it is to be understood that these frames may be cast iron with the apertured end walls formed integrally with the sides of the frame. It is to be understood that the forms of the invention herewith shown and described are to be taken as preferred examples of the invention and that various changes in the shape, size, and arrangement of parts may be resorted to without departing from the spirit of the invention or the scope of the subjoined claims.

Having thus described the invention, I claim:

1. In a take-up of the character described, a frame having guideways formed therefrom and an apertured end wall, a bearing slidable on said guideways, a take-up screw connected to said bearing for movement therewith but held against angular movement relative thereto, said screw extending through the aperture of said end wall, and a take-up nut journaled in said end wall aperture and threaded on said screw to effect travel of the screw and bearing upon rotation of the nut, said nut comprising a plurality of parts arranged on opposite sides of said end wall and threaded on the take-up screw, and means for holding said nut parts against relative angular movement while bearing against opposite faces of said end wall.

2. In a take-up of the character described, a frame having guideways formed therefrom and an apertured end wall, a bearing slidable on said guideways, a take-up screw connected to said bearing for movement therewith but held against angular movement relative thereto, said screw extending through the aperture of said end wall, and a take-up nut journaled in said end wall aperture and threaded on said screw to effect travel of the screw and bearing upon rotation of the nut, said nut comprising a plurality of parts arranged on opposite sides of the end wall and threaded on the take-up nut, means for holding said nut parts against relative angular movement while threaded on said screw, and tool engaging means formed on one of said nut parts for effecting rotation of said nut as a unit.

3. In a take-up of the character described, a frame having guideways formed therefrom and an apertured end wall, a bearing slidable on said guideways, a take-up screw connected to said bearing for movement therewith but held against angular movement relative thereto, said screw extending through the aperture of said end wall, and a take-up nut journaled in said end wall aperture and threaded on said screw to effect travel of the screw and bearing upon rotation of the nut, said nut comprising a plurality of parts arranged on opposite sides of said end wall and threaded on the take-up screw, means for holding said nut parts against relative angular movement while bearing against opposite faces of said end wall, and tool engaging means formed on the nut part which bears against the outer face of said end wall for effecting rotation of said nut as a unit.

4. In a take-up of the character described, a frame having guideways formed therefrom and an apertured end wall, a bearing slidable on said guideways, a take-up screw connected to said bearing for movement therewith but held against angular movement relative thereto, said screw extending through the aperture of said end wall, and a take-up nut journaled in said end wall aperture and threaded on said screw to effect travel of the screw and bearing upon rotation of the nut, said nut comprising a plurality of parts arranged on opposite sides of said end wall and threaded on the take-up screw, interlapping projections formed on the nut parts for holding the same against relative movement while threaded on said take-up screw, and a capstan head formed on one of said nut parts for effecting rotation of said nut as a unit.

5. In a take-up of the character described, a frame having guideways formed therefrom and an apertured end wall, a bearing slidable on said guideways, a take-up screw connected to said bearing for movement therewith but held against angular movement relative thereto, said screw extending through the aperture of said end wall, and a take-up nut journaled in said end wall aperture and threaded on said screw to effect travel of the screw and bearing upon rotation of the nut, said nut comprising a part threaded on the screw and having a collar bearing against one face of the apertured wall, a cylindrical portion journaled in said aperture and an extension beyond the cylindrical portion, and a second part threaded on the screw and having a collar bearing against the opposite face of said end wall, a socket to receive the extension of the first part and a capstan head to effect rotation of said nut.

6. In a take-up of the character described, a frame having guideways formed therefrom and an apertured end wall, a bearing slidable on said guideways, a take-up screw connected to said bearing for movement therewith but held against angular movement relative thereto, said screw extending through the aperture of said end wall, and a take-up nut journaled in said end wall aperture and threaded on said screw to effect travel of the screw and bearing upon rotation of the nut, said nut comprising a part threaded on the screw and having a collar bearing against one face of the apertured wall, a cylindrical portion journaled in said aperture and an extension beyond the cylindrical portion, and a second part threaded on the screw and having a collar bearing against the opposite face of said end wall, a socket to receive the extension of the first part and a capstan head to effect rotation of said nut, said extension and socket having interlocking engagement with each other to prevent relative rotation of the nut parts while threaded on said take-up screw.

7. In a take-up of the character described, a frame having guideways formed therefrom and an apertured end wall, a bearing slidable on said guideways, a take-up screw connected to said bearing for movement therewith but held against angular movement relative thereto, said screw extending through the aperture of said end wall, and a take-up nut journaled in said end wall aperture and threaded on said screw to effect travel of the screw and bearing upon rotation of the nut, said nut comprising a part threaded on the screw and having a collar bearing against one face of the apertured end wall and a semi-cylindrical extension surrounding the screw and journaled in said aperture, and a second part having a collar bearing against the opposite face of the apertured wall, a semi-cylindrical extension surrounding the screw in overlapped relation to the extension of the first-mentioned nut part and a capstan head to effect rotation of the nut.

8. In a take-up of the character described, a frame having guideways formed therefrom and an apertured end wall, a bearing slidable on said guideways, a take-up screw connected to said bearing for movement therewith but held against angular movement relative thereto, said screw extending through the aperture of said end wall, and a take-up nut journaled in said end wall aperture and threaded on said screw to effect travel of the screw and bearing upon rotation of the nut, said nut comprising a part threaded on the screw and having a collar bearing against one face of the apertured wall, a cylindrical portion journaled in said aperture and an extension beyond the cylindrical portion, and a second part threaded on the screw and having a collar bearing against the opposite face of said end wall, a socket to receive the extension of the first part and a capstan head to effect rotation of said nut, said extension and socket being of interfitting polygonal formation to prevent relative rotation of the nut parts while threaded on said take-up screw.

9. In take-ups of the character having a bearing slidable on a frame with a take-up screw connected to move with the bearing, the improvement which comprises an apertured end wall on the frame through which the take-up screw projects and a two-part nut journaled in said aperture with both parts of the nut threaded on the take-up screw, said nut parts bearing against opposite faces of the end wall to deliver compression and tension forces from the screw to the wall and having means interlocking to prevent relative angular movement between the parts while assembled on the screw and in engagement with said end wall.

10. In take-ups of the character having a bearing slidable on a frame with a take-up screw connected to move with the bearing, the improvement which comprises an apertured end wall on the frame through which the take-up screw projects and a two-part nut journaled in said aperture with both parts of the nut threaded on the take-up screw, said nut parts bearing against opposite faces of the end wall to deliver compression and tension forces from the screw to the wall and having means interlocking to prevent relative angular movement between the parts while assembled on the screw and in engagement with said end wall, one of said nut parts having a capstan head formed thereon to effect rotation of the nut as a unit.

11. In take-ups of the character described, in combination an apertured take-up frame wall, a take-up screw extending through said aperture, a two-part nut journaled in said aperture with both parts of the nut threaded on the screw, one of said nut parts comprising a collar portion, a reduced cylindrical portion projecting from one face of the collar, and an extension carried by the cylindrical portion, the second nut part comprising a body having a collar portion and a socket to receive the extension of the first nut part, said extension and socket having portions which interlock to prevent relative angular movement, and tool engaging means carried by one of said nut parts for effecting rotation of said nut as a unit.

12. In take-ups of the character described, in combination an apertured take-up frame wall, a take-up screw extending through said aperture, and a two-part nut journaled in said aperture with both parts of the nut threaded on the screw, one of said nut parts comprising a collar portion, a reduced cylindrical portion projecting from one side of the collar, and an extension having a hexagonal exterior carried by the cylindrical portion, the second nut part comprising a body having a collar portion and a hexagonally shaped socket to receive the extension of the first nut part, said hexagonal extension and socket effecting interlocking connection between the nut parts to prevent relative angular movement therebetween, and tool engaging means carried by one of said nut parts for effecting rotation of said nut as a unit.

13. In take-ups of the character described, in combination an apertured take-up frame wall, a take-up screw extending through said aperture, and a two-part nut journaled in said aperture with both parts of the nut threaded on the screw, one of said nut parts comprising an enlarged collar portion with a reduced cylindrical portion projecting therefrom and an extension on the outer end of the cylindrical portion, said extension including circumferentially spaced teeth formed on the end thereof, the second nut part comprising a body having a collar portion, a socket to receive the extension of the first nut part, said socket having spaced teeth to interlock with the teeth of the said extension, and tool engaging means to effect the rotation of the nut as a unit.

14. In take-ups of the character described, in combination a take-up frame having an apertured end wall, a take-up screw extending through said end wall aperture, a two-part nut journaled in said aperture with both of its parts threaded on the screw and bearing against opposite faces of said end wall, and telescopically associated polygonally shaped portions formed on both of said nut parts for preventing relative angular movement therebetween.

15. In take-ups of the character described, in combination a take-up frame having an apertured end wall, a take-up screw extending through said end wall aperture, a two-part nut journaled in said aperture with both of its parts threaded on the screw and bearing against opposite faces of said end wall, and telescopically associated portions formed on both of said nut parts and which are so shaped as to interlock for preventing relative angular movement between the parts.

GEORGE H. GRIFFIN.